United States Patent

[11] 3,594,990

| [72] | Inventor | Edwin Lawrence Hawley |
| | | Sittingbourne, Kent, England |
| [21] | Appl. No. | 822,112 |
| [22] | Filed | May 6, 1969 |
| [45] | Patented | July 27, 1971 |
| [73] | Assignee | E. P. S. (Research & Development) Limited |
| | | Sittingbourne, Kent, England |

[54] DEHUMIDIFIERS
12 Claims, 2 Drawing Figs.

[52] U.S. Cl. ..................................................... 55/162, 55/208, 55/387
[51] Int. Cl. ...................................................... B01d 53/00
[50] Field of Search ........................................ 55/28, 32, 33, 74, 208, 162, 387

[56] References Cited
UNITED STATES PATENTS
| 2,501,280 | 3/1950 | Kemp et al ..................... | 55/162 |
| 2,606,627 | 8/1952 | Asker ............................ | 55/162 |
| 2,633,928 | 4/1953 | Chamberlain .................. | 55/162 |
| 3,279,151 | 10/1966 | Kauer, Jr. et al ............... | 55/33 X |
| 3,292,346 | 12/1966 | Adams ........................... | 55/33 X |

Primary Examiner—Rueben Friedman
Assistant Examiner—R. W. Burks
Attorney—Kurt Kelman ABSTRACT: A portable dehumidifier comprising a body having a vapor inlet and outlet, means such as a fan for propelling such vapor from the inlet to the outlet; dehumidifying means including, for example, a desiccant for removing moisture from said vapor; and heating means, for example an electrical heating element, for expelling moisture retained by said dehumidifying means.

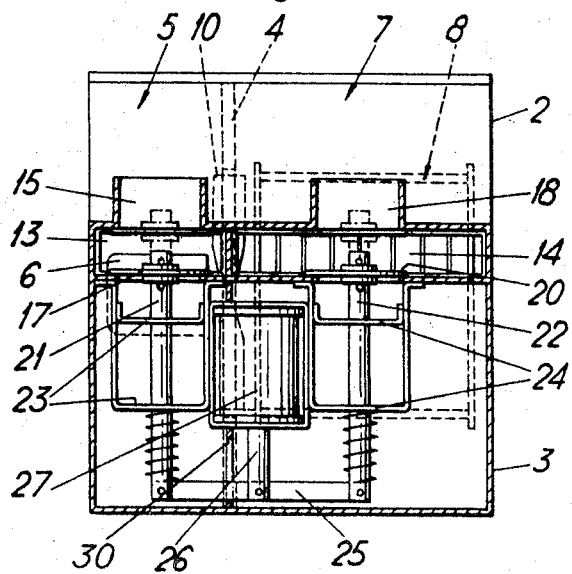

DEHUMIDIFIERS

This invention concerns dehumidifiers.

Dehumidifiers utilizing desiccants are well known but they all suffer from one or more serious disadvantages such as high operating costs (resulting from a lack of means for economically discharging moisture from the desiccant after use), high initial purchase cost because of the complexity of the construction of the dehumidifier, and/or an incapability of providing for a continuous cycle of operations. Efforts to provide a dehumidifier which does not suffer from certain of the above disadvantages has been made by utilizing a method of condensing moisture from the gas and/or vapor being dehumidified by refrigeration. Such refrigeration dehumidifiers become progressively less efficient with the lowering of the temperature of the gas and/or vapor being dehumidified and at a temperature below 50° F. such dehumidifiers are generally unsatisfactory.

One object of this invention therefore is to provide a dehumidifier which more satisfactorily meets present day requirements and which in particular is efficient over a wide range of temperatures, which is simple and reliable and which is easily portable.

According to this invention there is provided a portable dehumidifier comprising a body having a first gas and/or vapor inlet and outlet; means for propelling a gas and/or vapor from the first inlet towards the first outlet; dehumidifying means for removing moisture from said gas and/or vapor; and heating means for expelling moisture retained by said dehumidifying means. The heating means comprises an electrically conductive wire and the dehumidifying means comprises a fire-resistant electrically insulating cover wrapped about the wire, such cover being impregnated with, or carrying, a desiccant, such wrapped wire being located in the gas/vapor flow path. A second inlet and a second outlet are provided in the body, the second inlet and the second outlet being opened only when the first inlet and outlet are closed. The second inlet and second outlet permit, when open, a gas to be propelled through the desiccant when the heating means are operative so that such gas collects and carries from the desiccant moisture previously retained thereby.

According to one feature of this invention while the entire fan unit including its motor may lie within the gas/vapor flow path, conveniently the blades only of the fan unit lie in such flow path.

While many suitable desiccants may be used very conveniently the desiccant is either lithium chloride, silica gel, aluminum oxide or aluminum silicate.

Advantageously valve assemblies may be provided, one of said assemblies serving to open and close one or other of the two inlets while the other valve assembly serves to open and close one or other of the outlets.

Preferably said valve assemblies incorporate poppet valve members although alternative valve assemblies can be utilized. In any event such valve assemblies may expediently be operated by one or more solenoids and such solenoid(s) may conveniently be coupled to a timing mechanism so that actuation of the solenoid(s) occurs at preset time intervals.

In order that the invention may be more readily understood, and further features thereof more readily appreciated, three embodiments of dehumidifier in accordance with this invention will now be described by way of example, and with reference to, the accompanying drawings in which:

FIG. 2 is a section of the line II–II of FIG. 1.

Figure 1:
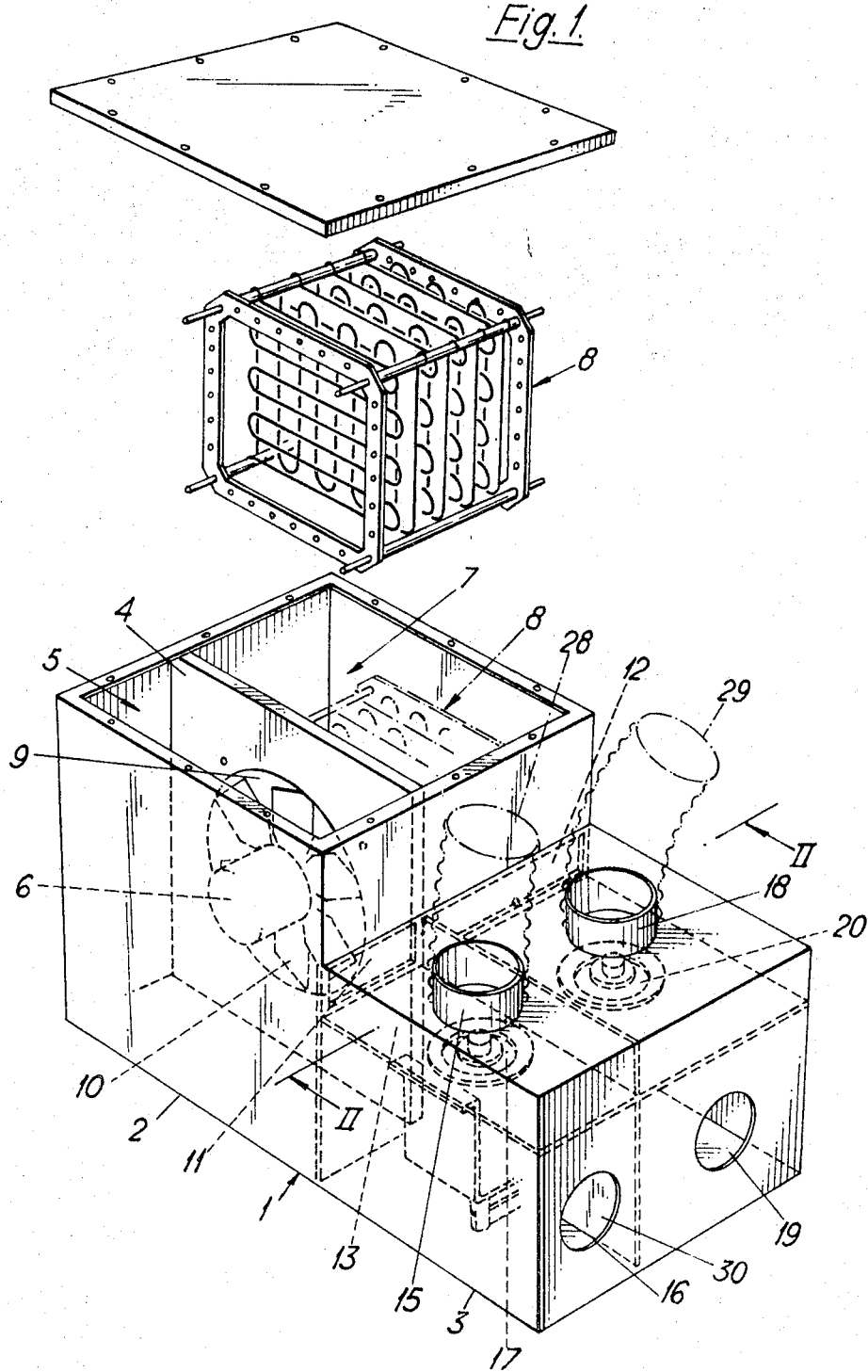
FIG. 1 is an exploded perspective view of a preferred embodiment of portable dehumidifier in accordance with this invention.

In the embodiment shown in FIGS. 1 and 2 of the accompanying drawings the portable dehumidifier comprises a body 1 comprising a pair of adjacent boxlike structures respectively designated 2, 3 the boxlike structure 2 being divided by a partition 4 into an inlet chamber 5 housing an electric fan motor 6 and an outlet chamber 7 housing a combined heating and desiccating core generally designated 8.

The partition 4 is apertured at 9 and gas/vapor impelling blades 10 carried by fan motor 6 rotate within said aperture 9 so that gas/vapor is drawn from the inlet chamber 5 and is forced into the outlet chamber 7 and through the heating and desiccating core 8.

The inlet chamber 5 is provided with a rectangular gas/vapor inlet opening 11 and the outlet chamber 7 is provided with a gas/vapor outlet opening 12.

The boxlike structure 3 is divided into two primary ducts, an inlet duct 13 which communicates with the inlet opening 11 and an outlet duct 14 which communicates with the outlet opening 12. The inlet duct 13 is provided with first and second inlets respectively designated 15, 16 and a valve member 17 cooperates with these inlets 15, 16 so that when one inlet is open the other inlet is closed.

The outlet duct 14 is similarly provided with first and second outlets respectively designated 18, 19 and such outlets 18, 19 are opened and closed by a valve member 20.

It will be understood that in one position of the valve members 17, 20 the first inlet 15 and first outlet 18 will be open and the second inlet 16 and second outlet 19 will be closed. Likewise when the first inlet and first outlet are closed the second inlet and second outlet will be open.

Each of the valve members 17, 20 comprise a flexible sealing disc supported centrally by shafts 21, 22 guided for longitudinal movement in apertured webs 23, 24, the ends of these shafts 21, 22 being coupled to one another by a coupling bar 25 which is coupled, intermediate ends to an axially movable rod 26 of a solenoid 27. Compression springs are provided about the shafts 21, 22 so that such shafts (and the valve members 17, 20 carried thereby) are normally biased into a position where the second inlet 16 and second outlet 19 are closed and the first inlet 15 and the first outlet 18 are open. It will be understood, however, that energization of the solenoid 27 will result in axial movement of the rod 26 and equivalent movement of the shafts 21, 22 so that the valve members 17, 20 move to a position where the second inlet 16 and second outlet 19 are open and the first inlet 15 and first outlet 18 are closed.

The boxlike structure 2, as has been stated hereinbefore, houses the fan motor 6 and the heating and desiccating core 8. In this particular embodiment the fan motor 6 is a single-phase shaded-pole motor which is capable of moving approximately 100 cubic feet of gas/vapor per minute.

The heating and desiccating core 8 comprises a plurality of formers which support, in the form of a matrix, approximately 30 yards of nichrome wire eighteen-thousandths of an inch in diameter, such wire being covered with asbestos yarn. This asbestos yarn is impregnated with a desiccant which in this instance is lithium chloride. In fact the 30 yards of wire form, at 250 volts, a 300 watt element. While it is not shown in the accompanying drawings a thermostatic safety switch is employed in the gas/vapor flow path in the region of the heater element so that electrical current flowing through the nichrome wire element would be switched off should the heat in such flow path exceed a predetermined value.

The above-described dehumidifier has particular application in the dehumidifying of gas and/or vapor in the weatherproof containers used for storing corrodible items such as machines, such weatherproof containers being used extensively by the armed forces for preserving a wide variety of equipment such as transport vehicles, tanks, missiles, guns, ammunition and a wide variety of other equipment.

When it is desired to dehumidify the contents of such a weatherproof container by using the above-described portable dehumidifier it is merely necessary to couple by, for example, flexible pipes 28, 29 of the dehumidifier to the container. Assuming that the pipes 28, 29 are so coupled to the container and assuming that the valve members 17, 20 are in the position shown in FIG. 2 (their condition when the solenoid is not energized) energization of the fan motor 6 will result in the air/vapor within the container being drawn into the first inlet 15 via pipe 28 and from this inlet 15 through inlet opening 11 and into the inlet chamber 5 whereupon such gas/vapor will pass through the aperture 9 in the partition 4 and will pass through the core 8 so that it will come into intimate contact with the lithium chloride desiccant which is carried by the asbestos insulation extending over the wire element. Such gas/vapor after passing over the desiccant will then be forced through the outlet opening 12 into the outlet duct 14 and then through the first outlet 18 and back to the container via flexible pipe 29. This cycle of operation would be continued either till the humidity within the container has dropped to the desired level or until the desiccant ceases to be effective.

Once the desiccant has become ineffective (or at least only partially effective) the desiccant is regenerated. Regeneration of the desiccant takes place as follows: The solenoid 27 is energized whereupon the rod 26 is moved axially in a direction to cause longitudinal movement of the shafts 21, 22 against the action of the compression springs. Such movement of the shafts 21, 22 causes the valve members 17, 20 to move until they engage about the periphery of the first inlet 15 and the first outlet 18 and close the same. Such movement of the valve members 17, 20 causes the second inlet 16 and second outlet 19 to become open and air surrounding the dehumidifier will be drawn into such inlet 16. Such air would then pass from the inlet 16 to the inlet duct 13 through the inlet opening 11 into the inlet chamber 5 and then over the desiccating core 8 in the outlet chamber 17. Electrical circuitry is arranged so that on operation of the solenoid energizing circuit current is passed through the wire of the core whereupon the heating and desiccating core 8 will become warm and moisture collected by the desiccant will be evaporated and will be carried away by the air being drawn into the inlet 16. Such moisture-carrying air will then pass through the outlet opening 12 into the outlet duct 14 and then out of the second outlet 19. A plate 30 is provided to prevent moist air emitted from the duct 14 from being drawn into the duct 13.

When the moisture has been driven from the desiccant the heating current is ceased and the solenoid is deenergized so that a dehumidifying cycle can be continued.

Such energization of the solenoid is conveniently arranged to occur at manually or automatically preset time intervals. Such solenoid would be associated with a switch which automatically controls the heating current. Likewise the time cycle for regeneration would desirably be preset so that after such preset time cycle has elapsed the core heating current would automatically be ceased and deenergization of the solenoid would occur so that the regeneration cycle would be terminated. Preferably automatic switching of the heater current and of the solenoid energization current will be effected by a standard timing motor operating a plurality of switches by means of a cam. With such an arrangement the timing sequence can be altered by using different cams.

However, a typical time cycle would consist of a 4-hour dehumidifying cycle and a half hour desiccant regeneration cycle.

In the embodiment described hereinbefore the valve assemblies in the inlet and outlet chambers are simple and efficient so that any chance of leaking of gas/vapor occuring between the interior of the dehumidifier and the container is minimized so that the likelihood of inflation or partial evacuation of the container being dehumidified.

I claim:
1. A portable dehumidifier comprising
   1. a body having
      a. a first gaseous fluid inlet and outlet, and
      b. a second gaseous fluid inlet and outlet, the second inlet and outlet being open only when the first inlet and outlet are closed;
   2. means for propelling a gaseous fluid along a flow path from the first inlet towards the first outlet;
   3. dehumidifying means for removing moisture from the gaseous fluid; and
   4. heating means for expelling moisture retained by the dehumidifying means, the heating means comprising
      c. an electrically conductive wire, and the dehumidifying means comprising
      d. a fire-resistant, electrically insulating cover wrapped about the wire, said wrapped wire being located in the gaseous fluid flow path and said cover carrying
      e. a desiccant,
      f. the open second inlet and outlet permitting a gas to be propelled through the desiccant when the heating means are operative whereby the gas collects and carries from the desiccant moisture previously retained thereby.

2. The portable dehumidifier of claim 1, wherein the means for propelling the gaseous fluid comprises an electric fan unit having blades and an electric motor.

3. A portable dehumidifier according to claim 2, wherein the entire fan unit, including its electric motor, lies within the flow path.

4. The portable dehumidifier of claim 2, wherein only the blades of the fan unit are positioned in the flow path.

5. A portable dehumidifier according to claim 1, wherein the wire is wrapped with asbestos which is impregnated with the desiccant.

6. A dehumidifier according to claim 1, wherein the desiccant comprises lithium chloride.

7. A portable dehumidifier according to claim 1, wherein the desiccant is silica gel.

8. A portable dehumidifier according to claim 1, wherein the desiccant comprises aluminum oxide or aluminum silicate.

9. A portable dehumidifier according to claim 1, further comprising valve assemblies, one of said assemblies serving to open and close one or other of the two inlets while the other valve assembly serves to open and close one or other of the outlets.

10. A portable dehumidifier according to claim 9, wherein said valve assemblies incorporate poppet valve members.

11. The portable dehumidifier of claim 10, further comprising a solenoid for operating the valve assemblies.

12. The portable humidifier of claim 11, further comprising a timing mechanism coupled to the solenoid for actuating the solenoid at preset time intervals.